United States Patent [19]
Fox et al.

[11] Patent Number: 5,507,181
[45] Date of Patent: Apr. 16, 1996

[54] NON-INTRUSIVE MOUNTING SYSTEM AND METHOD FOR MICROWAVE INSTRUMENTS

[75] Inventors: Thomas M. Fox, Phoenix; Roger L. Sevison, Gilbert, both of Ariz.

[73] Assignee: Motorola, Inc., Schaumburg, Ill.

[21] Appl. No.: 172,956

[22] Filed: Dec. 27, 1993

[51] Int. Cl.[6] ............................................. G01F 23/28
[52] U.S. Cl. .................... 73/290 V; 342/124; 367/908
[58] Field of Search .................. 73/290 V, 323, 73/324, 325, 330, 331, 334; 342/124; 343/784; 367/908

[56] References Cited

U.S. PATENT DOCUMENTS

| | | | |
|---|---|---|---|
| 4,169,309 | 10/1979 | Meginnis | 73/334 X |
| 4,566,321 | 1/1986 | Zacchio | 73/290 R |
| 4,833,918 | 5/1989 | Jean et al. | 73/290 V |
| 4,850,213 | 7/1989 | Steinebrunner et al. | 73/290 V |
| 4,986,636 | 1/1991 | Contzen et al. | 73/334 X |
| 5,121,628 | 6/1992 | Merkl et al. | 73/290 V |

FOREIGN PATENT DOCUMENTS 4106427  4/1992  Japan ............................... 73/290 V

OTHER PUBLICATIONS

"Continuous Level Measuring Systems", Acoustica Associates, Inc. Bulletin No. 4303 Model AL Series A Feb. 28, 1968. (73–290 v).

Primary Examiner—Christopher W. Fulton
Assistant Examiner—Willie Morris Worth
Attorney, Agent, or Firm—Bradley J. Botsch, Sr.; Jeffrey D. Nehr

[57] ABSTRACT

A non-intrusive mounting system and method for coupling microwave instruments to a container flange having an opening into a container. The mounting system includes a microwave transparent window and a mounting flange having a window recess for accommodating the microwave transparent window. The microwave transparent window is compressively fastened over the container opening between the mounting flange and the container flange. Microwave instruments such as radar level sensing apparatus can be mounted on and removed from the mounting flange without breaking the seal to the container.

8 Claims, 2 Drawing Sheets

NON-INTRUSIVE MOUNTING SYSTEM AND METHOD FOR MICROWAVE INSTRUMENTS

FIELD OF THE INVENTION

This invention relates in general to mounting systems and in particular to non-intrusive mounting systems and methods for microwave instruments including level sensing apparatus.

BACKGROUND OF THE INVENTION

The use of storage tanks is widespread in such applications as the food, beverage, and pharmaceutical industries, as well as the oil and chemical industries. The need exists to mount microwave instrumentation, such as level sensing apparatus, to tanks or containers in use in such industries to, for example, provide accurate level measurement for inventory control and custody transfer.

Large storage tanks may be on the order of 100 feet (30 meters) deep and 100 to 200 feet (30 to 60 meters) across. Process tanks may be on the order of 10 to 17 feet (3 to 5 meters) deep and 10 to 17 feet (3 to 5 meters) across. Historically, liquid levels have been measured by lowering a device into the tank from a roof-mounted platform. Devices used for this purpose have included long sticks and both manual and automated versions of weighted strings or wires which can be lowered into the tank until the liquid (or solid) content is touched. The depth of the material in the tank, and thus the volume of material in the tank, can then be readily determined from the length of the stick, string, or wire. The early use of sticks has led to the term "sticking the tank" for describing the level measurement procedure. While such mechanical methods have continuously been improved and can achieve a very high accuracy in some applications, all such methods require a physical intrusion of the tank environment. There is thus a potential for contamination of the tank contents and for the corrosion, and the ultimate destruction of the measuring device itself.

Over the past approximately fifteen years, various level measuring devices using radar techniques have been developed. With the use of radar techniques the material to be measured is not touched; however, the antenna which radiates and receives microwave energy in order to make the measurement, is mounted inside the tank. In many tank environments, a corrosive gaseous atmosphere exists in the space above the liquid and the antenna material erodes. The antenna material thus contaminates the tank contents. Other applications may require a hygienic container environment where isolation from sensors is also desirable.

What is needed is a non-intrusive mounting system and method for microwave instrumentation such as level sensing apparatus which can be outside the tank interior atmosphere and have a low vertical profile. Such a system would desirably allow for easy removal of electronic instrumentation in applications such as level sensing and allow for the use of a small antenna, including a planar antenna, in such a system. The apparatus would have a relatively short height compared to existing radar level measurement systems and would handle tank pressures at least to approximately 150 pounds per square inch (psi) (approximately $10^6$ pascal). Moreover, such a method and apparatus would desirably accommodate prevalent 2 inch (5.08 cm) and 8 inch (20.32 cm) standard flange openings and be flexible and readily configurable to other desired pipes.

DETAILED DESCRIPTION OF THE DRAWINGS

Figure 1:
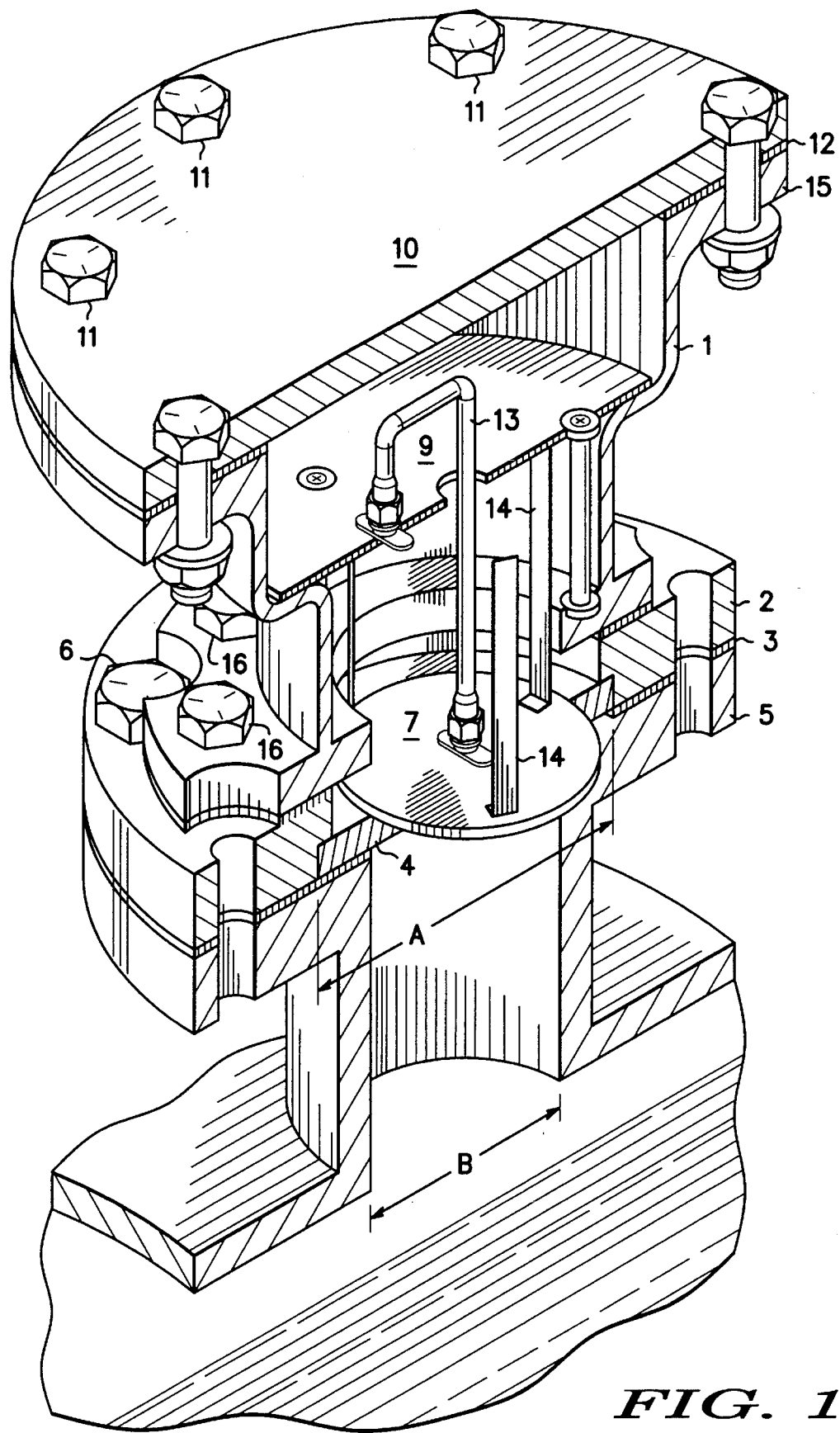
In FIG. 1, there is shown an isometric cross-sectional view of a non-intrusive mounting system and method for microwave instruments in accordance with a preferred embodiment of the invention; and In FIG. 2, there is shown an isometric cross-sectional view of a second non-intrusive mounting system and method for microwave instruments in accordance with a second preferred embodiment of the invention.

In FIG. 1, there is shown an isometric cross-sectional view of a non-intrusive mounting system and method for microwave instruments in accordance with a preferred embodiment of the invention. In FIG. 1, there is shown a particular microwave instrument, i.e. level sensor assembly 1, to which cover 10 is attached by fasteners 11. Fasteners 11 can be a variety of conventional fastening means, e.g. nuts and bolts. Cover gasket 12 is sandwiched between cover 10 and a cover-receiving flange 15 portion of level sensor assembly 1 when cover 10 and level sensor assembly 1 are securely fastened together, e.g. by nuts and bolts.

Level sensor assembly 1 in FIG. 1 contains electronics printed wiring assembly (PWA) 9, antenna feed 13, antenna holders 14 and antenna 7. The electronics PWA 9 is fastened within level sensor assembly 1 by conventional means. The electronics PWA 9 comprises an approximately central aperture to accommodate antenna feed 13 passing from the upper portion of the electronics PWA 9 to connect with antenna 7.

The lower portion of level sensor assembly 1, as shown in FIG. 1, comprises mounting flange 2. Mounting flange 2 comprises an inner recess, shown in the preferred embodiment as a recess diameter of window diameter "A". Window diameter A is larger than the tank pipe (or container opening) of inner diameter "B", which is the inner diameter of the container flange 5. Sealing gasket 3 is sandwiched between mounting flange 2 and container flange 5, with microwave transparent window 4 sealed within the inner recess (window diameter A) when mounting flange 2 and container flange 5 are fastened with attachment hardware 6 (e.g., conventional fasteners such as nuts and bolts). Although microwave transparent window 4 and the inner recess (window diameter A) are circular in shape as shown in FIG. 1, they can be any shape so long as microwave transparent window 4 covers the container opening (inner diameter B) when mounting flange 2 is mated with container flange 5 in the assembled position as shown in FIG. 1.

In FIG. 1, cover 10 and level sensor assembly 1, including cover receiving flange 15 and mounting flange 2 can be made of conventional materials such as conventional piping material, other metals, or even plastics. Electronics PWA 9 can be a conventional circuit board material with electronic components such are known in the art for generating microwave signals to provide level sensing. The antenna holding means 14 may be comprised of a variety of materials, but in the preferred embodiment are phosphor bronze strips with notched clip ends to hold antenna 7.

When fastened at their upper end to the level sensor assembly 1 or the electronics PWA 9, the antenna holding means 14 act as springs with which to hold planar antenna 7 about its edge. The antenna holding means 14 exert pressure about the edge of antenna 7 toward the center of antenna 7 to hold it securely by virtue of the antenna holding means 14 displacement outward (with respect to the central longitudinal axis of the level sensor assembly 1) during installation of planar antenna 7. The antenna holding means 14 optional notches can securely hold the edge of antenna 7 with such spring pressure.

The window diameter A is associated with a window perimeter, which can be varied to withstand the pressure differential (including an adequate safety factor) between the inside of the container (with entrance aperture consisting of container opening of inner diameter B) and the ambient pressure. The sealing gasket 3 provides the perimeter seal to withstand the pressure differential. The microwave transparent window 4 material also provides a thermal barrier between the container interior and the level sensor assembly 1 (or another instrument).

The window material can be selected from a variety of many available materials to suit the intended application requirements, which may include requirements for temperature, pressure, resistance to chemical attack, and cleanliness as appropriate to food, beverage, and pharmaceutical products. The window material can be any of the following materials, among others: "ULTEM®1000" from the General Electric Company Plastics Group in Pittsfield, Mass.; "FLUORSINT®500" from the Polymer Corporation in Reading, Pa.; "TEFLON®PTFE" from Du Pont Company in Wilmington, Del.; polyphenelene sulfide "RYTON®" from Phillips 66 Company Plastics Division in Bartesville, Okla.; "POLYKETONE KADEL® E1130" from Amoco Chemical Company in Chicago, Ill.; or polythalamide "P.P.A. AMODEL®A1133HS" from Amoco Chemical Company in Chicago, Ill.

The antenna 7 comprises conducting circuit elements on a planar substrate. The planar substrate is not attached to the microwave transparent window 4, or the mounting flange 2, thereby allowing removal of the level sensor apparatus 1 (or other instrument) without disturbing the seal to the container (comprising the mounting flange 2, the microwave transparent window 4, the container flange 5, and the sealing gasket 3 held compressively together with flange attachment hardware 6). The microwave instrument attachment hardware 16 allows for removal of the level sensor assembly 1 without disturbing the seal to the container.

When mounting flange 2 and container flange 5 are fastened as shown in FIG. 1, antenna 7, held fixed within level sensing assembly 1 by antenna holders 14, is immediately adjacent to (but not contacting) microwave transparent window 4. (For tuning purposes, the antenna is usually positioned an integral number of half wavelengths away from the microwave transparent window; for a 24 GHz signal, one-half wavelength is approximately 0.625 cm.) Microwave signals generated using the electronics PWA 9 are sent via antenna feed 13 to antenna 7, where they radiate from antenna 7 through microwave transparent window 4 into the container for which container flange 5 is a access port with container opening of inner diameter B.

Figure 2:
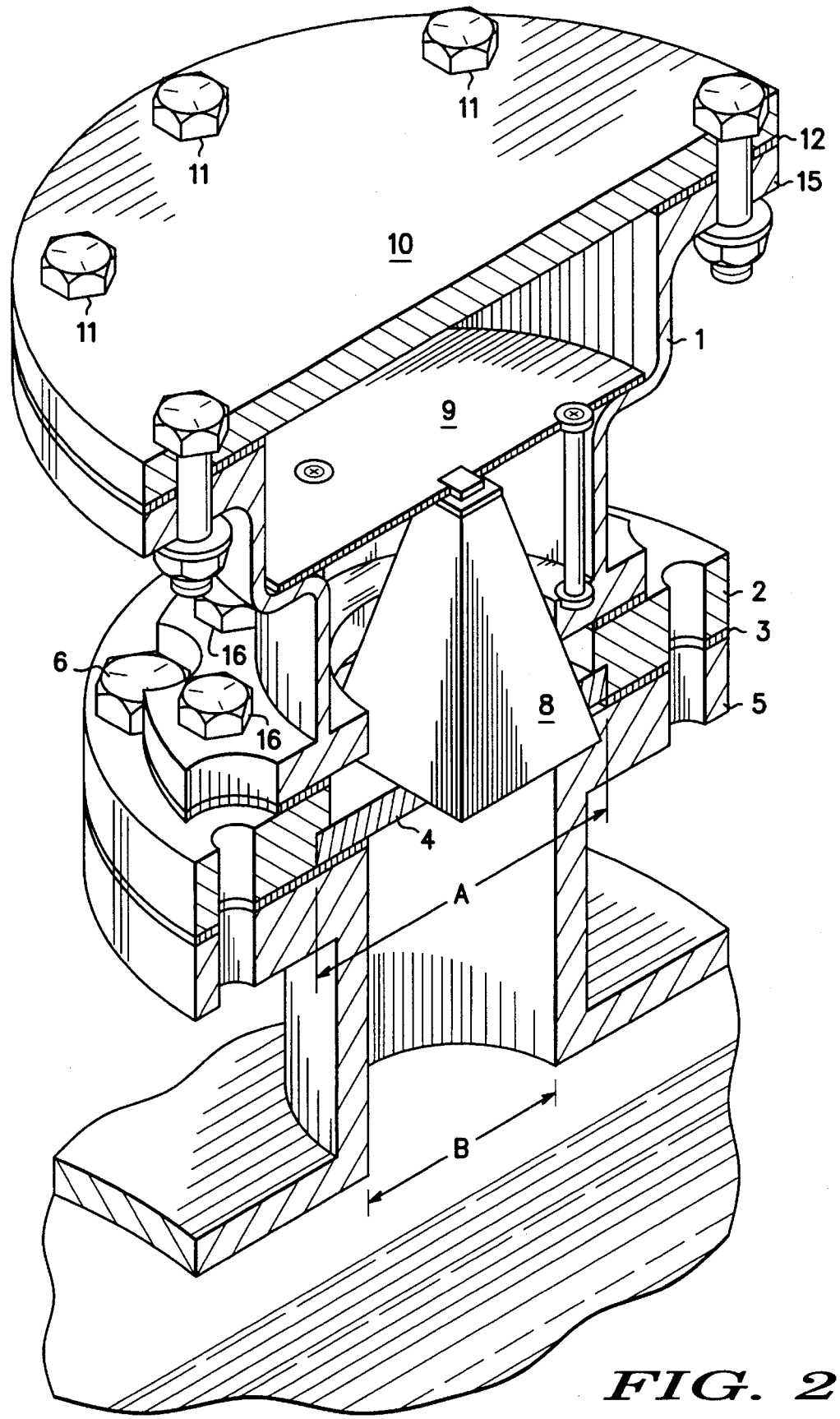

In FIG. 2, there is shown an isometric cross-sectional view of a second non-intrusive mounting system and method for level sensor apparatus in accordance with a preferred embodiment of the invention. Common reference numbers in FIG. 2 compared with FIG. 1 refer to the same elements, materials, and functions as in FIG. 1. The difference in the FIG. 2 embodiment is that the antenna feed 13, the antenna holding means 14 and the antenna 7 of FIG. 1 are replaced with antenna horn 8 in FIG. 2, which can be attached to electronics PWA 9. Antenna horn 8 is not attached to the microwave transparent window 4 or the mounting flange 2 to allow for the removal of the level sensor assembly 1 (or other instrument) without disturbing the integrity of the container seal. Antenna horn 8 can be a conventional antenna horn to generate the microwave signals to provide the means for the radar level sensing technique. Antenna horn 8 sends the microwave signals generated directly through microwave transparent window 4 and into the container in FIG. 2.

Thus, a non-intrusive mounting system and method for microwave instruments has been described which overcomes specific problems and accomplishes certain advantages relative to prior art methods and mechanisms. The improvements over known technology are significant. The non-intrusive mounting system and method for microwave instruments provides sensor isolation from the contamination of the product whose level is to be measured. For example, for the application described, the level sensor is more reliable than an in-container system because it is not exposed to the container environment. Planned maintenance and periodic repair of sensors is averted because of the sensor isolation from the tank. Hygienic containers can be more easily cleaned because the container internal surface is not disrupted by sensor intrusion. The non-intrusive mounting system and method described permits installation on existing standard container fittings (flanges), precluding the need for costly container retrofit. Particularly of interest are national pipe standard flange sizes of 2 inches and 8 inches (5.08 cm) and 20.32 cm, respectively) for which approximately 1.8 inch and 7 inch (4.572 cm and 17.78 cm, respectively) planar antennas have been developed. Furthermore, any microwave instrument is readily removable without disturbing the container seal provided by the mounting flange and microwave transparent window. In addition, the microwave transparent window provides a thermal and pressure barrier permitting the level sensor or other instrument to operate on containers with hostile interior environments (e.g., corrosive, high or low pressure, or high or low temperature).

Thus, there has also been provided, in accordance with an embodiment of the invention, a non-intrusive mounting system and method for microwave instruments that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims. Particularly, while the FIG. 1 and FIG. 2 embodiments have disclosed particular microwave instruments, i.e. microwave level sensing apparatus, it is readily apparent to one of ordinary skill in this art that the non-intrusive mounting system and method contemplated is suitable for use with a wide variety of microwave or other instrumentation.

What is claimed is:

1. A non-intrusive mounting system for coupling a microwave instrument to a container flange having an opening into a container, the mounting system comprising:

a microwave transparent window;

a mounting flange gasket with a central aperture;

a mounting flange to which the microwave instrument can be removably are coupled by microwave instrument attachment hardware, the mounting flange having a central aperture that aligns with the central aperture of the mounting flange gasket and a window recess for accommodating the microwave transparent window such that the microwave transparent window can be placed to cover the opening in the container flange the central aperture of the mounting flange gasket, and the central aperture in the mounting flange when the container flange and the mounting flange are aligned; flange attachment hardware for coupling the mounting flange to the container flange, and wherein the microwave transparent window and the mounting flange gasket can be compressively fastened between the mounting flange and the container flange when the mounting flange is coupled to the container flange by the flange attachment hardware.

2. A non-intrusive mounting system as claimed in claim 1, wherein the microwave instrument comprises:

a printed wiring assembly for generating a microwave level sensing signal; and an antenna coupled to the printed wiring assembly, wherein the antenna directs the microwave level sensing signal through the microwave transparent window to the content revel.

3. A non-intrusive mounting system as claimed in claim 2, wherein the antenna comprises a planar antenna.

4. A non-intrusive mounting system as claimed in claim 3, wherein the microwave instrument further comprises holding means for holding the planar antenna immediately adjacent to the microwave transparent window without fasteners.

5. A non-intrusive mounting system as claimed in claim 2, wherein the antenna comprises a horn antenna.

6. A method for providing non-intrusive mounting of microwave instrument onto a container flange having an opening into a container, the method comprising the steps of:

providing a microwave transparent window;

providing a mounting flange gasket with a central aperture;

positioning a mounting flange over the opening into the container flange the mounting flange having a central aperture that aligns with the central aperture of the mounting flange gasket and having the microwave instrument coupled by microwave instrument attachment hardware to the mounting flange;

aligning the container flange and the mounting flange;

placing the microwave transparent window into a window recess in the mounting flange for accommodating the microwave transparent window;

fastening the mounting flange with flange attachment hardware to the container flange such that the microwave transparent window is compressed over the opening into the container.

7. A method for mounting non-intrusive level sensing apparatus onto a container flange having an opening into a container, the method comprising the steps of:

providing a microwave transparent window;

providing a mounting flange gasket with a central aperture;

positioning a mounting flange over the opening in the container flange, the mounting flange having a central aperture that aligns with the central aperture of the mounting flange gasket and having the level sensing apparatus coupled by level sensing apparatus attachment hardware to the mounting flange;

aligning the container flange and the mounting flange;

placing the microwave transparent window into a window recess in the mounting flange for accommodating the microwave transparent window;

fastening the mounting flange to the container flange with flange attachment hardware such that the microwave transparent window is compressed over the opening into the container.

8. A method for mounting non-intrusive level sensing apparatus as claimed in claim 7, further comprising the step of holding a planar antenna of the level sensing apparatus immediately adjacent to the microwave transparent window without fasteners.

* * * * *

UNITED STATES PATENT AND TRADEMARK OFFICE
CERTIFICATE OF CORRECTION

PATENT NO. : 5,507,181
DATED : April 16, 1996
INVENTOR(S) : Thomas M. Fox et al.

It is certified that error appears in the above-indentified patent and that said Letters Patent is hereby corrected as shown below:

In column 5, claim 6, line 31, before the word "microwave" insert --a--.

Signed and Sealed this

Thirtieth Day of July, 1996

Attest:

BRUCE LEHMAN

*Attesting Officer*   *Commissioner of Patents and Trademarks*